United States Patent
Leroy

(10) Patent No.: US 7,836,692 B2
(45) Date of Patent: Nov. 23, 2010

(54) EXHAUST LINE ELEMENT PROVIDED WITH A TURBOCOMPRESSOR

(75) Inventor: Vincent Leroy, Montbeliard (FR)

(73) Assignee: Faurecia Systemes d'Echappement, Nanterre (FR)

( * ) Notice: Subject to any disclaimer, the term of this patent is extended or adjusted under 35 U.S.C. 154(b) by 585 days.

(21) Appl. No.: 11/883,358

(22) PCT Filed: Jan. 31, 2006

(86) PCT No.: PCT/FR2006/000214

§ 371 (c)(1),
(2), (4) Date: Sep. 28, 2007

(87) PCT Pub. No.: WO2006/079732

PCT Pub. Date: Aug. 3, 2006

(65) Prior Publication Data

US 2008/0202117 A1     Aug. 28, 2008

(30) Foreign Application Priority Data

Jan. 31, 2005  (FR)  ................... 05 00958
Apr. 19, 2005  (FR)  ................... 05 03914

(51) Int. Cl.
*F02D 23/00*  (2006.01)
*F02B 37/00*  (2006.01)
*F01N 1/00*  (2006.01)
*F01N 7/10*  (2006.01)

(52) U.S. Cl. .......................... 60/602; 60/323

(58) Field of Classification Search ............ 60/602, 60/605.2, 605.3, 320–324; F02M 25/07
See application file for complete search history.

(56) References Cited

U.S. PATENT DOCUMENTS

| 2,678,529 | A | * | 5/1954 | Buchi ................... 60/321 |
| 2,886,945 | A |   | 5/1959 | Hofer ................... 60/321 |
| 3,557,549 | A | * | 1/1971 | Webster ................ 60/602 |
| 3,559,397 | A | * | 2/1971 | Navarro ................ 60/602 |
| 3,581,494 | A | * | 6/1971 | Scheitlin et al. ........ 60/282 |
| 3,750,403 | A | * | 8/1973 | Deutschmann et al. .... 60/323 |
| 4,207,742 | A | * | 6/1980 | Dommes et al. ........ 60/602 |
| 4,395,884 | A | * | 8/1983 | Price .................. 60/602 |
| 4,815,274 | A | * | 3/1989 | Piatti ................. 60/323 |
| 4,932,372 | A | * | 6/1990 | Meneely ............... 60/602 |

(Continued)

FOREIGN PATENT DOCUMENTS

DE       100 50 158 A1    4/2002

(Continued)

*Primary Examiner*—Thai Ba Trieu
(74) *Attorney, Agent, or Firm*—Young & Thompson

(57) ABSTRACT

An exhaust line element for a supercharged heat engine includes an exhaust manifold and a turbocompressor. The manifold includes at least two separate inlets equipped with connection elements at the outlet of the cylinders of the engine and a discharge outlet for the exhaust gases which is common to the different inlets and which is connected to the inlet tube of the turbocompressor, a bundle of internal tubes converging towards the outlet, each from an inlet of the manifold, and an outer casing inside which the bundle of tubes extends. The inlet tube and the discharge outlet are connected by a peripheral weld seam provided between the outer casing and the inlet tube, and the bundle of tubes is left free from any welding to the inlet tube at the discharge outlet.

14 Claims, 3 Drawing Sheets

U.S. PATENT DOCUMENTS

| | | | | |
|---|---|---|---|---|
| 5,349,817 A * | 9/1994 | Bekkering | ................... | 60/322 |
| 5,463,867 A * | 11/1995 | Ruetz | ......................... | 60/323 |
| 5,727,386 A * | 3/1998 | Watanabe et al. | ............ | 60/323 |
| 6,122,911 A | 9/2000 | Maeda et al. | ................. | 60/323 |
| 6,301,889 B1 * | 10/2001 | Gladden et al. | ............ | 60/605.2 |
| 6,523,343 B2 | 2/2003 | Dürr et al. | ................... | 60/323 |
| 6,941,755 B2 * | 9/2005 | Bucknell et al. | ............. | 60/602 |
| 7,234,302 B2 | 6/2007 | Körner | ........................ | 60/323 |
| 7,269,950 B2 * | 9/2007 | Pedersen et al. | ............. | 60/602 |
| 7,428,814 B2 * | 9/2008 | Pedersen et al. | ............. | 60/602 |
| 2008/0066465 A1 * | 3/2008 | Maidens | ..................... | 60/599 |
| 2009/0241528 A1 * | 10/2009 | Leroy | ......................... | 60/323 |
| 2009/0266065 A1 * | 10/2009 | Barrieu et al. | ............... | 60/323 |

FOREIGN PATENT DOCUMENTS

| | | | |
|---|---|---|---|
| EP | 1 426 557 A1 | | 6/2004 |
| FR | 2 816 003 | | 5/2004 |
| JP | 58172427 A | * | 10/1983 |
| JP | 61250344 A | * | 11/1986 |
| JP | 06147027 A | * | 5/1994 |
| JP | 2001317351 A | * | 11/2001 |
| JP | 2003120302 A | * | 4/2003 |

\* cited by examiner

EXHAUST LINE ELEMENT PROVIDED WITH A TURBOCOMPRESSOR

BACKGROUND OF THE INVENTION

1. Field of the Invention

The present invention relates to an exhaust line element for a supercharged heat engine, of the type comprising an exhaust manifold and a turbocompressor which comprises a chamber for circulation of the exhaust gases which comprises a guiding bladed wheel therein and which has an inlet tube for the exhaust gases, the manifold comprising at least two separate inlets equipped with connection means at the outlet of the cylinders of the engine and a discharge outlet for the exhaust gases which is common to the different inlets and which is connected to the inlet tube of the turbocompressor, the manifold comprising a bundle of internal tubes which converge towards the outlet, each from an inlet of the manifold, and an outer casing inside which the bundle of tubes extends.

2. Description of the Related Art

At the present time, a number of motor vehicles having a heat engine comprise a turbocompressor at the outlet of the engine. The turbocompressor comprises, as known per se, a first chamber (turbine) through which exhaust gases pass, and a second chamber (compressor) through which the air which supplies the engine passes. A wheel is arranged in each chamber. These two wheels are coupled in rotation so that the air which is introduced into the engine is compressed under the action of the compressor wheel driven by the turbine wheel which is moved by the circulation of the exhaust gases.

The outlet of the circulation chamber for the exhaust gases of the turbocompressor is connected to the exhaust line whilst the inlet thereof is connected at the outlet of the exhaust manifold. This manifold generally comprises a plurality of convergent tubes, each of which is associated with an outlet of a cylinder, and an outer casing in which the various internal tubes are contained.

In order to guide the exhaust gases, the connection between the exhaust manifold and the inlet of the turbocompressor is produced by means of two flanges, one of which is provided at the inlet of the turbocompressor and the other at the outlet of the manifold. These two flanges are connected to each other by means of a connection device, in particular by bolts.

An arrangement of this type is particularly effective in providing the connection but the production cost thereof is high.

SUMMARY OF THE INVENTION

The object of the invention is to provide a manifold/turbocompressor assembly for which the external leakage between the manifold portion and the turbocompressor portion is reduced, the total mass is reduced, the thermal inertia optimised and the production cost reduced.

To this end, the invention relates to an exhaust line element of the above-mentioned type, characterised in that the inlet tube and the outlet of the manifold are connected by means of a peripheral weld seam which is provided between the outer casing and the inlet tube of the turbocompressor, and in that the bundle of tubes is left free from any welding to the inlet tube of the turbocompressor at the outlet of the manifold.

According to specific embodiments, the invention comprises one or more of the following features:

- the inlet tube comprises, at the end thereof, an outer peripheral shoulder which delimits a portion of the tube which has a smaller thickness and which is fitted in the outer casing of the outlet of the manifold;
- the manifold comprises a sliding joint which is interposed between the bundle of tubes and the outer casing;
- the sliding joint is formed by a ring of metal mesh;
- the bundle of tubes is engaged in the inlet tube of the turbocompressor at the outlet of the manifold;
- the tubes of the bundle of tubes are separate from each other along the entire length thereof from the inlets of the manifold to the outlet of the manifold;
- the bundle of tubes is constituted by ceramic tubes; and
- the bundle of tubes extends inside the inlet tube of the turbocompressor over a length which is greater than 40 mm.

BRIEF DESCRIPTION OF THE DRAWING FIGURES

The invention will be better understood from a reading of the following description, given purely by way of example and with reference to the drawings, in which.

DETAILED DESCRIPTION OF THE INVENTION

Figure 1:
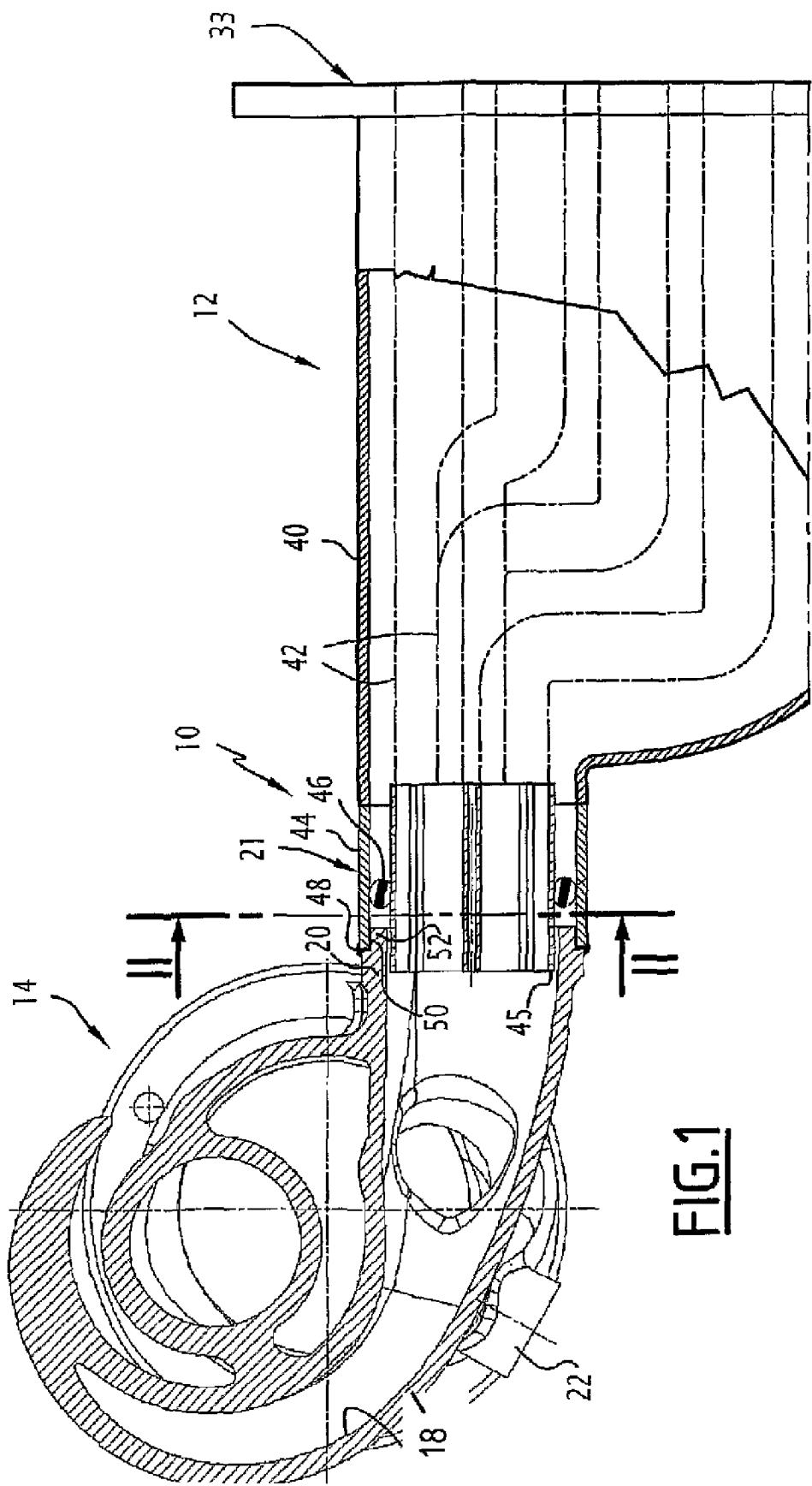
FIG. 1 is a partially sectioned schematic view of a turbocompressor associated with a manifold.

FIG. 1 illustrates an exhaust line element 10 of a supercharged heat engine comprising a manifold 12 and a turbocompressor 14.

An exhaust line element of this type is located on a motor vehicle which comprises an internal combustion engine, an air inlet line allowing the engine to be supplied with fresh air and an exhaust line allowing exhaust gases from the engine to be discharged.

The exhaust line comprises, successively from the engine, the exhaust manifold 12 which allows the exhaust gases which are discharged from the combustion chambers of the engine to be recovered, the turbocompressor 14, one or more units for processing the exhaust gases collected, one or more exhaust silencers and finally a discharge outlet.

As known per se, the turbocompressor comprises a turbine which is arranged in the exhaust line, and a compressor which is arranged on the air inlet line of the engine.

The turbine comprises a chamber 18 which has, on the one hand, an inlet tube 20 which is connected to a common outlet 21 of the manifold 12 and, on the other hand, an outlet which is not completely visible in FIG. 1 and which is connected to the remainder of the exhaust line. The turbine comprises a bladed wheel which is arranged in the chamber 18.

The compressor comprises a chamber which has an inlet which is connected to the air intake and an outlet which is connected to a distributor which allows the fresh air to be distributed in the various combustion chambers of the engine.

The compressor comprises a bladed wheel which is located in the chamber.

The bladed wheel of the turbine and the bladed wheel of the compressor are coupled in rotation.

More specifically, the bladed wheel of the turbine and the bladed wheel of the compressor are arranged so as to rotate about the same axis of rotation and are coupled to each other by means of a shaft which extends along the axis of rotation.

In conventional manner, the bladed wheel of the compressor is driven by the bladed wheel of the turbine which is caused to rotate under the action of the flow of the exhaust gases.

The rotation of the bladed wheel of the compressor increases the pressure of the air at the outlet of the compressor, which allows the combustion chambers of the engine to be supercharged with fresh air.

The manifold 12 essentially comprises a sealed outer casing 40 in which four exhaust gas discharge tubes 42 are received and are each associated with an exhaust outlet of a cylinder of the heat engine having a plurality of cylinders.

These internal tubes 42 are obtained, for example, by means of hydroforming. They converge towards one another from the inlets 33 of the manifold, each corresponding to each cylinder, in order to form a bundle of tubes which open at the outlet 21 of the manifold into an outlet conduit 44 of the outer casing 40.

Figure 2:
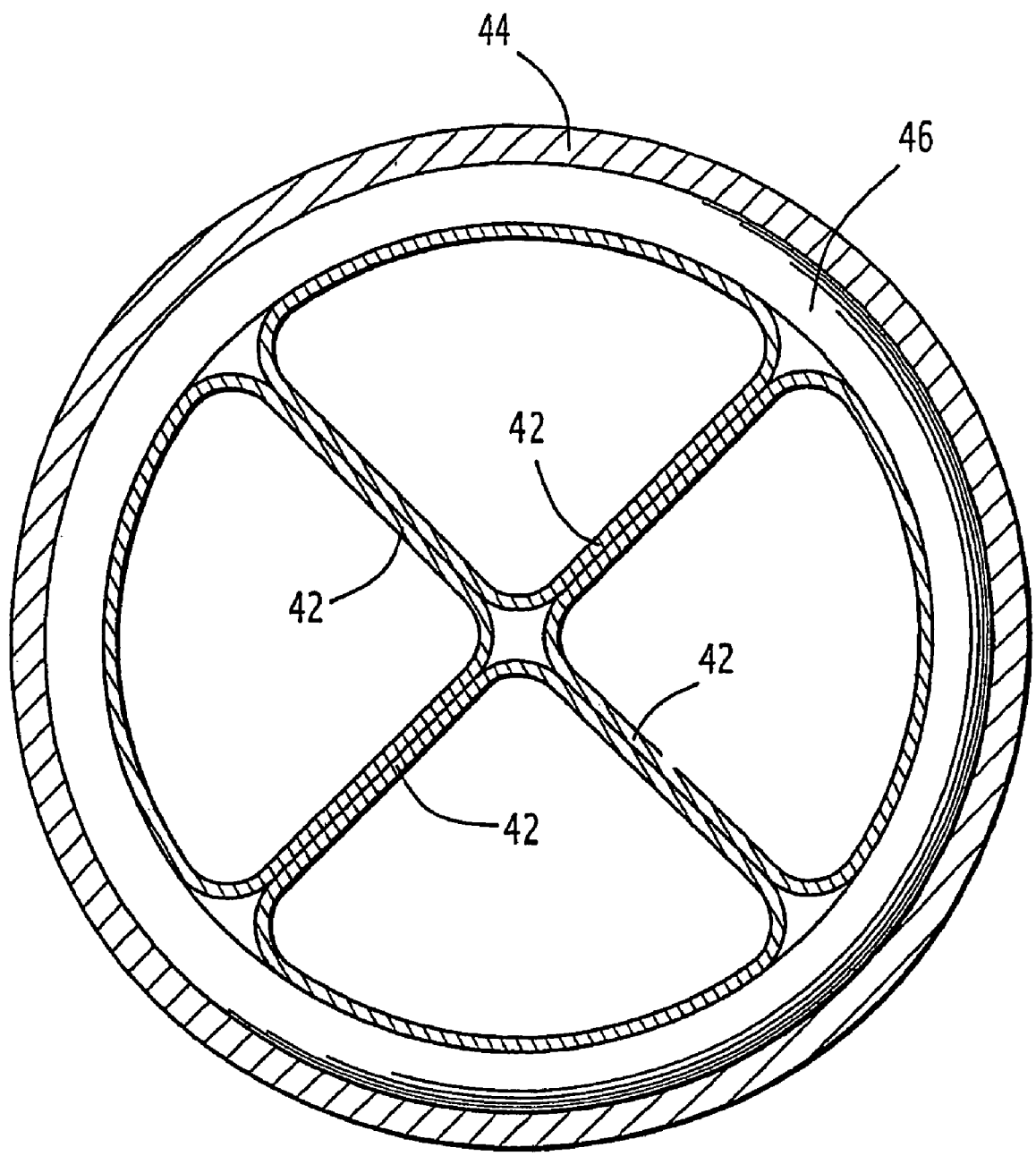
FIG. 2 is a cross-section of the manifold, taken along the line II-II of FIG. 1.

The tubes 42 are preferably independent from each other along the entire length thereof. In this manner, they are arranged in a contiguous manner in the conduit 44. They all open in the same plane which is transverse relative to the conduit 44 at the downstream end thereof designated 45. At this end, each tube has a cross-section in the form of a quarter of a disc as illustrated in FIG. 2.

The four tubes 42 are held in a radial position in the conduit 44 by means of a sliding joint 46 which is formed by a ring of metal mesh. The conduit 44 and the tubes 42 terminate substantially in the same plane.

As illustrated in FIG. 1, the joint 46 surrounds the bundle of tubes and is gripped between the bundle of tubes 42 and the outer casing 40. It is capable of providing the sealing and the isolation of the inter-wall space between the tubes and the casing. Furthermore, the joint is slidingly mounted so that the tubes can expand axially and move relative to the casing without the joint connecting them to the casing in a rigid manner. The joint is thus caused, during the expansion phases, to deform and/or move relative to the casing 40 and/or the tubes 42.

The inlet tube 20 of the turbocompressor has no connection flange. The outlet 21 of the casing of the manifold is welded to the open end of the inlet tube 20 by means of a peripheral weld seam 48. To this end, the inlet tube 20 of the turbocompressor has, at the outer side, a shoulder 50 for receiving the end of the outlet conduit 44 of the casing so that the outer surfaces of the tube 20 and the outlet conduit 44 are substantially in alignment.

In this manner, at the inlet of the turbocompressor, there is formed a portion 52 having a smaller thickness which is fitted in the outer conduit 44 at the outlet 21 of the manifold.

The peripheral weld seam 48 is formed at the outer side between the casing of the manifold and the tube of the turbocompressor.

The bundle of internal tubes 42 is free relative to the outlet conduit 44 of the manifold and relative to the inlet tube 20 of the turbocompressor. The end of the bundle of internal tubes 42 is engaged inside the inlet tube 20 of the turbocompressor so that the end of the tubes 42 extends beyond the end of the inlet tube 20.

The joint 46 provides sealing in order to prevent the exhaust gases from returning into the inter-wall space provided between the outer casing and the internal conduits of the manifold, and also retains the bundle of internal tubes in position.

It is considered that an arrangement of this type allows a turbocompressor/manifold assembly to be provided which has a far reduced production cost.

Furthermore, retaining the internal tubes of the manifold using the single joint allows the production cost to be further reduced.

The use of a weld seam in order to provide the connection allows the total mass to be reduced for the element which is constituted by the turbocompressor and the manifold and allows any risk of leakage in the region of the connection to be eliminated, a leakage of this type being very disadvantageous in terms of emissions of pollutants.

Furthermore, the welding allows the internal guiding tubes for the gases to remain separate as far as to the inlet of the turbocompressor, thus preventing the mixture of gaseous flows from the different cylinders.

The freedom of the bundle of tubes 42 relative to the conduit 44 and the outer casing 40, on the one hand, and relative to the tube 20, on the other hand, allows the bundle of tubes to be able to expand without fatigue of the materials due to thermal expansions.

Figure 3:
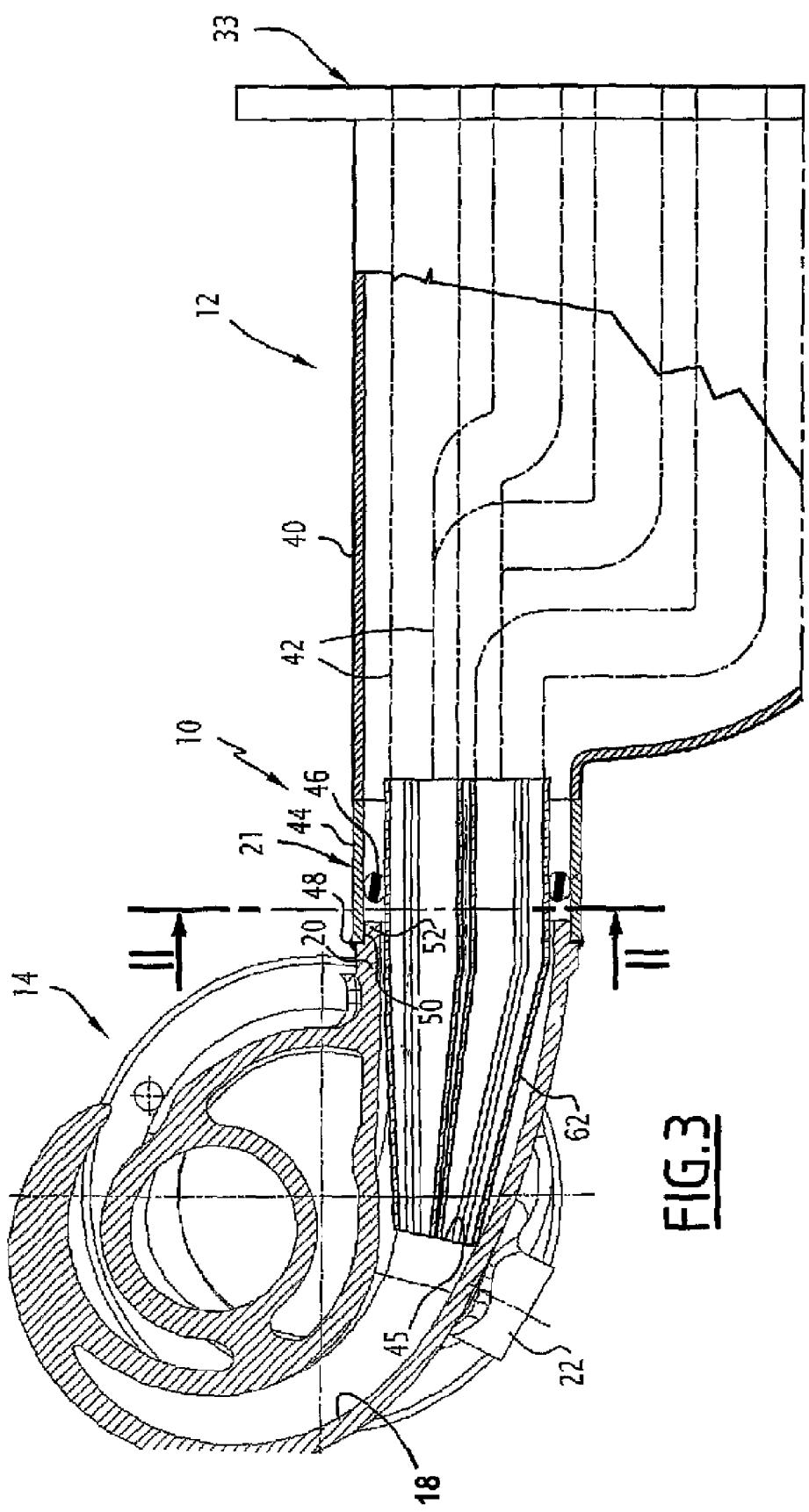
FIG. 3 is a view identical to that of FIG. 1 of a variant of a manifold associated with a turbocompressor.

FIG. 3 illustrates a variant of a manifold according to the invention. In this embodiment, the tubes 42 of the bundle of tubes are formed from a composite ceramic material which is reinforced with fibres as described in particular in the patent applications WO-2004/106705 and U.S. Pat. No. 6,725,656. In this instance, advantageously, the bundle of tubes extends along an inner portion 62 inside the inlet tube 20 of the turbocompressor 14. Advantageously, this inner portion 62 extends beyond the end of the inlet tube 20 over a length greater than 40 mm and preferably between 50 mm and 60 mm. In this manner, the downstream end of the bundle of tubes extends in the region of a branch 22 of the chamber 18, this branch allowing the control referred to as "waste gate". Along the inner portion 62, the tubes have a progressively decreasing cross-section in order to follow the inner profile of the inlet tube of the chamber 18.

The inner portion is sized so as to be spaced-apart from the inlet tube 20 at each point.

The tubes 42 thus extend inside the turbocompressor as close as possible to the turbine, allowing hot gases to be conveyed to the turbine without losing heat by contact with the inlet tube 20. It is possible to extend the bundle of tubes as close as possible to the turbine, taking into account the use of a ceramic material for forming the tubes, since a material of this type has an extremely low expansion coefficient, thus allowing precise and constant adjustment between the inlet tube and the bundle of tubes 42 and allowing the tubes 42 to be prevented from touching the turbine when becoming hot.

The invention claimed is:

1. An exhaust line element for a supercharged heat engine, comprising an exhaust manifold (12) and a turbocompressor (14) which comprises a chamber (18) for circulation of the exhaust gases which comprises a guiding bladed wheel therein and which has an inlet tube (20) for the exhaust gases, the manifold (12) comprising at least two separate inlets (33) equipped with connection means at the outlet of the cylinders of the engine and a discharge outlet (21) for the exhaust gases which is common to the different inlets (33) and which is connected to the inlet tube (20) of the turbocompressor (14), the manifold (12) comprising a bundle of internal tubes (42) which converge towards the outlet (21), each from an inlet (33) of the manifold, and an outer casing (40) inside which the bundle of tubes (42) extends, wherein the inlet tube (20) and the outlet (21) of the manifold are connected by means of a peripheral weld seam (48) which is provided between the outer casing (40) and the inlet tube (20) of the turbocompressor (14), and in that the bundle of tubes (42) is left free from any welding to the inlet tube (20) of the turbocompressor (14) at the outlet (21) of the manifold (12).

2. The exhaust line element according to claim 1, wherein the inlet tube (20) comprises, at the end thereof, an outer peripheral shoulder (50) which delimits a portion (52) of the tube which has a reduced thickness and which is fitted in the outer casing (40) of the outlet (21) of the manifold (12).

3. The exhaust line element according to claim 2, wherein the manifold (12) comprises a sliding joint (46) which is interposed between the bundle of tubes (42) and the outer casing (40).

4. The exhaust line element according to claim 3, wherein the sliding joint (46) is formed by a ring of metal mesh.

5. The exhaust line element according to claim 2, wherein the bundle of tubes (42) is engaged in the inlet tube (20) of the turbocompressor (14) at the outlet (21) of the manifold (12).

6. The exhaust line element according to claim 2, wherein the tubes (42) of the bundle of tubes are separate from each other along the entire length thereof from the inlets (33) of the manifold to the outlet (21) of the manifold (12).

7. The exhaust line element according to claim 2, wherein the bundle of tubes (42) is constituted by ceramic tubes.

8. The exhaust line element according to claim 1, wherein the manifold (12) comprises a sliding joint (46) which is interposed between the bundle of tubes (42) and the outer casing (40).

9. The exhaust line element according to claim 8, wherein the sliding joint (46) is formed by a ring of metal mesh.

10. The exhaust line element according to claim 1, wherein the bundle of tubes (42) is engaged in the inlet tube (20) of the turbocompressor (14) at the outlet (21) of the manifold (12).

11. The exhaust line element according to claim 10, wherein the bundle of tubes (42) is constituted by ceramic tubes.

12. The exhaust line element according to claim 11, wherein the bundle of tubes (42) extends inside the inlet tube (20) of the turbocompressor (14) over a length which is greater than 40 mm.

13. The exhaust line element according to claim 1, wherein the tubes (42) of the bundle of tubes are separate from each other along the entire length thereof from the inlets (33) of the manifold to the outlet (21) of the manifold (12).

14. The exhaust line element according to claim 1, wherein the bundle of tubes (42) is constituted by ceramic tubes.

* * * * *